…

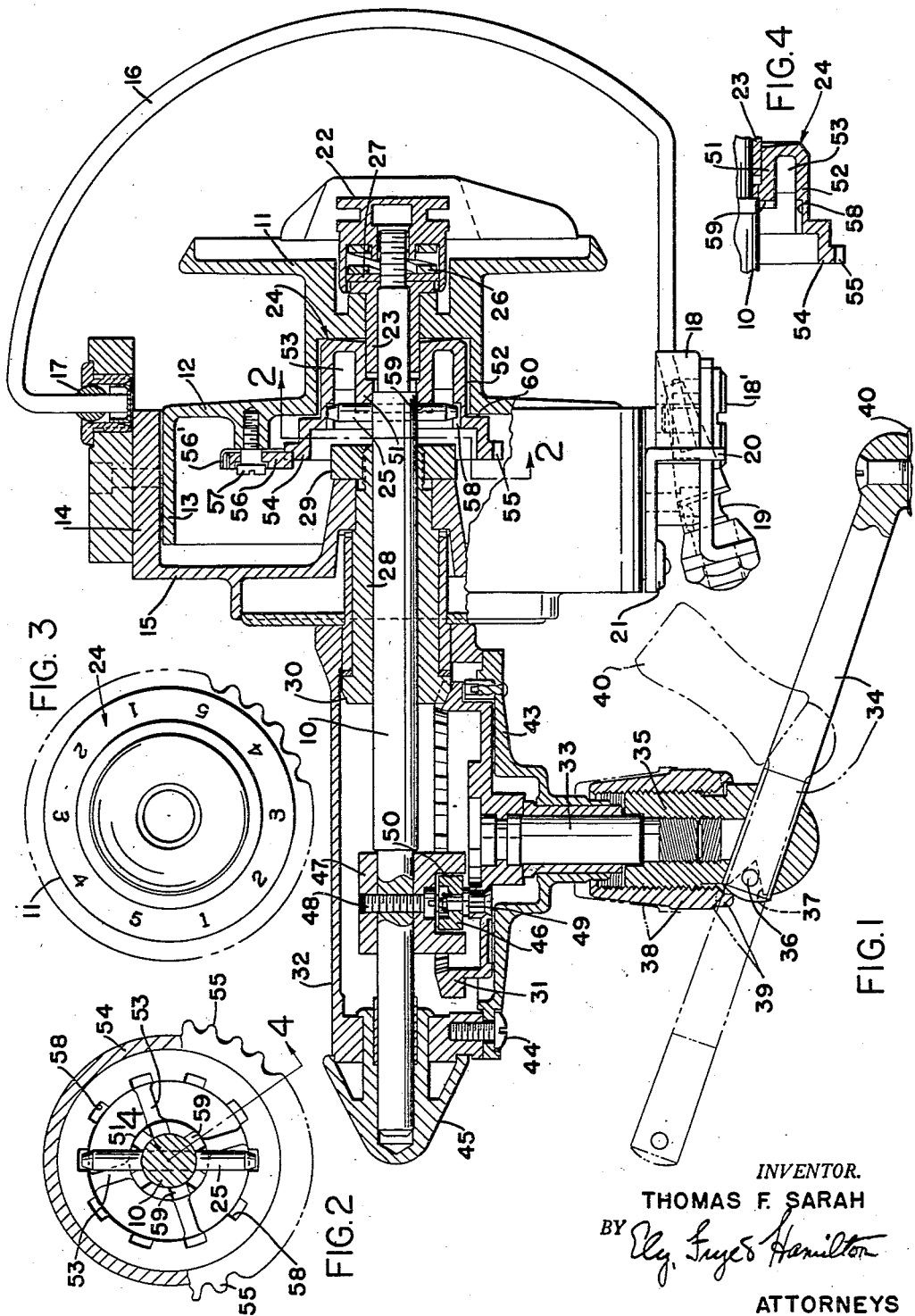

United States Patent Office 2,766,956
Patented Oct. 16, 1956

2,766,956

SALT WATER SPINNING REEL

Thomas F. Sarah, Akron, Ohio, assignor to The Enterprise Manufacturing Company, Akron, Ohio, a corporation of Ohio Application March 29, 1955, Serial No. 497,646

8 Claims. (Cl. 242—84.6)

The invention relates generally to spinning reels for fishing, and more particularly to a spinning reel designed for salt water fishing and having an improved construction.

Spinning reels have a pick-up arm or bale which guides the line onto the spool during winding and the arm is mounted on a carrier surrounding the spool. As the line is wound by rotating either the spool or the carrier, either the spool or carrier reciprocates to level wind the line on the spool.

It is desirable to provide means for adjusting the spool with respect to the pick-up arm so that the level wind action corresponds exactly to the full width of the spool, and also to provide means for adjusting the drag or tension on the spool to allow it to turn independently to prevent breaking of the line when the pull exceeds a predetermined amount. In the present invention both of these adjustments are made in a simple manner at the outer end of the spool.

Accordingly, it is an object of the present invention to provide a spinning reel having improved means at one end of the reel for adjusting the relative positions of the spool and the pick-up arm.

Another object is to provide means at the same end of the reel for adjusting the drag on the spool.

These and other objects are accomplished by the improved construction of the present invention, a preferred embodiment of which is shown by way of example in the accompanying drawing and described in detail herein. Various modifications and changes in details of construction are comprehended within the scope of the invention as defined in the appended claims.

In the drawing:

Fig. 1 is a longitudinal sectional view of the improved reel construction, showing the collapsed or adjusted position of the crank handle in chain lines.

Fig. 2 is a fragmentary sectional view on line 2—2 of Fig. 1 to show the ratchet bushing for adjusting the position of the spool relative to the pick-up arm.

Fig. 3 is a detached view of the opposite end of the ratchet bushing.

Fig. 4 is a fragmentary sectional view as on line 4—4 of Fig. 2.

The spinning reel shown in Fig. 1 has a spool shaft 10 on the outer end of which is mounted the spool 11. The inner spool flange 12 has a rearwardly disposed annular flange 13 which extends within the annular flange 14 of a cup-shaped carrier 15 on which the bale or pick-up arm 16 is mounted for swinging over the spool. One end of the arm 16 is rotatably mounted in the flange 14 by means of the ball joint 17. The other end is connected to a bracket 18 rotatable on a pivot screw 18' on the opposite side of the carrier, and the bracket 18 carries a line guide roller 19 for guiding the line to the spool when the bale 16 is in winding position.

A latch 20 engages the bracket 18 to selectively hold the bale either in the winding or casting position, and spring means (not shown) is provided for yieldingly urging the bale to winding position when the latch is tripped. The latch is pivoted at 21 on the carrier 15, and suitable mechanism is provided within the carrier for tripping the latch at the start of the winding operation. The parts thus far described are typical of spinning reels such as shown in my copending application Serial No. 371,385, filed July 30, 1953, now Patent No. 2,713,463 of July 19, 1955, and per se form no part of the present invention.

The spool 11 is held on the shaft 10 by means of a nut 22 screwed on the end of the shaft, and the nut abuts the end of a bushing 23 on which the spool is non-rotatively mounted, and in which the shaft is journaled. The pressure of the nut 22 holds the spool in frictional abutment with the face of a ratchet bushing 24 which is fixed on the shaft by a pin 25. A spring washer member 26 within the nut 22 is interposed between the nut and a washer 27 slidable along the flat end of the nut and abutting the bushing 23. Thus by adjusting the nut the amount of pressure of the spool on the ratchet bushing 24 and hence the amount of drag on the spool is adjusted.

The shaft has journaled thereon a bushing 28 which extends within and is fixed to the reentrant hub of the carrier 15 by a nut 29. The inner end of the bushing 28 has a bevel pinion gear 30 formed thereon which meshes with a bevel ring gear 31 within the housing 32 for rotating the carrier. The gear 31 is secured on the inner end of a crank shaft 33 extending at right angles to the spool shaft 10.

A crank handle 34 is mounted in an inclined position on the outer end of the shaft, and preferably extends slidably through a hole in the outer end of a cap 35 screwed on the outer end of shaft 33. The end of the crank handle has a cross pin 36 fixed therein, and the pin is normally engaged in a V-notch 37 in the cap 35 to prevent turning of the handle. A locking sleeve bushing 38 is screwed on the exterior of cap 35 and has an outer annular flange 39 for normally engaging over the end of crank handle 34 to hold the pin 36 in V-notch 37.

Thus, by screwing the locking bushing 38 inwardly on shaft 33 and releasing the crank handle, the handle may be slid rearwardly to the position shown in chain lines in Fig. 1 and the finger piece 40 on the outer end of the handle rotated inwardly, to place the handle in an out-of-the-way position for storing and shipping the reel.

Crank shaft 33 is journaled in a sleeve bushing 42 which is mounted in a housing plate 43 secured to housing 32 by screws 44 and enclosing the gear 31 within the housing. The rear end of the spool shaft 10 is slidably mounted in an end wall of the housing by a cone shaped bushing 45 which extends beyond the end wall and has an outer conical flange peened to the housing.

In order to reciprocate the shaft 10 axially to move the spool in and out of the carrier 15 as the carrier rotates, an eccentrically located roller 46 on the ring gear 31 is connected to a yoke 47 secured on the shaft by means of a screw 48. The roller 46 is journaled on a pin 49 mounted eccentrically of the gear, and the roller is rotatably received in a cylindrical socket 50 on the underside of the yoke 47.

The novel means for adjusting the spool 11 axially of the shaft relative to the carrier 15 and pick-up arm 16 so that the line will be evenly level wound on the spool throughout its full width, preferably includes means for adjusting the axial position of the ratchet bushing 24 against which the spool abuts. This bushing has a hub 51 which receives the bushing 23 at its outer end and engages the pin 25 at its inner end. A cylindrical flange 52 surrounds the hub and is connected thereto by radial ribs 53, and terminates at its inner end in an outturned annular flange portion 54 having ratchet teeth 55 in its outer rim. The teeth 55 are engaged by a click pawl 56 yieldingly held against the teeth by a spring 56'. The pawl 56 is pivotally mounted on the spool by a screw 57. When the pull on the line exceeds the drag and rotates the spool 11 on the shaft 10, the pawl ratchets over the teeth 55. The ratchet bushing 24 and the pawl 56 may be made of plastic material if desired.

The inner end of cylindrical flange 52 of the ratchet bushing is provided with pairs of circumferentially spaced diametrically opposite notches 58 of graduated depths for selectively receiving the ends of the pin 25, and radially aligned notches 59 of corresponding depths are provided in the hub 51 for receiving the central portion of the pin. As shown, there are five pairs of notches 58, each pair of different depth than the others, and the pairs are numbered 1 through 5 on the outer annular shoulder 60. Radially aligned with each pair of notches 58 are two notches 59 of the same depth in the hub 51.

In order to adjust the position of the spool 11 on the shaft 10 relative to the carrier 15, the nut 22 is unscrewed and the spool removed from the shaft. The ratchet bushing 24 may then be moved away from the pin 25 to disengage it from the notches 58 and 59, and the bushing is then rotated so as to engage another set of notches 58 and 59 of different depth with the pin. The numbers 1 through 5 on the outer annular shoulder 60 are opposite the pairs of notches 58 of graduated depths, number 1 designating the shallowest and number 5 designating the deepest notches, as a visual aid in making the adjustment.

Thus, the five pairs of notches 58 represent five different adjusted positions of the spool on the shaft, and the adjustment is easily made by removing the nut at the outer end of the shaft which controls the amount of drag on the spool.

What is claimed is:

1. In a spinning reel for fishing having a spool shaft, a pick-up arm carrier and spool mounted on the shaft for relative rotation, and means for causing relative reciprocation of said carrier and spool during said relative rotation, a pin secured in said shaft and projecting laterally therefrom, a bushing on said shaft and having a plurality of notches of different depth for selectively engaging said pin, and a nut on the end of the shaft for holding the spool in abutment with said bushing and said pin engaged in a selected notch.

2. In a spinning reel for fishing having a spool shaft, a pick-up arm carrier and spool mounted on the shaft for relative rotation, and means for causing relative reciprocation of said carrier and spool during said relative rotation, a pin secured in said shaft and projecting laterally therefrom, a bushing on said shaft and having a plurality of notches of different depth for selectively engaging said pin, a nut on the end of the shaft for holding the spool in abutment with said bushing and said pin engaged in a selected notch, and yielding means between the nut and spool to apply a drag on the spool.

3. In a spinning reel for fishing having a spool shaft, a pick-up arm carrier and spool mounted on the shaft for relative rotation, and means for causing relative reciprocation of said carrier and spool during said relative rotation, a pin secured in said shaft and projecting laterally therefrom, a bushing on said shaft and having in one end a plurality of pairs of diametrically opposite notches of different depths for selectively engaging the ends of the pin, and a nut on the end of the shaft for holding the spool in abutment with the other end of said bushing and said pin engaged in a selected pair of notches.

4. In a spinning reel for fishing having a spool shaft, a pick-up arm carrier and spool mounted on the shaft for relative rotation, and means for causing relative reciprocation of said carrier and spool during said relative rotation, a pin secured in said shaft and projecting laterally therefrom, a bushing on said shaft and having in one end a plurality of pairs of diametrically opposite notches of different depths for selectively engaging the ends of the pin, a nut on the end of the shaft for holding the spool in abutment with the other end of said bushing and said pin engaged in a selected pair of notches, and yielding means between the nut and spool to apply a drag on the spool.

5. In a spinning reel for fishing having a spool shaft, a pick-up arm carrier and spool mounted on the shaft for relative rotation, and means for causing relative reciprocation of said carrier and spool during said relative rotation, a pin secured in said shaft and projecting laterally therefrom, a ratchet bushing on said shaft having external teeth and a plurality of internal notches of different depth for selectively engaging said pin, a ratchet pawl engaging said teeth, and a nut on the end of the shaft for holding the spool in abutment with said bushing and said pin engaged in a selected notch.

6. In a spinning reel for fishing having a spool shaft, a pick-up arm carrier and spool mounted on the shaft for relative rotation, and means for causing relative reciprocation of said carrier and spool during said relative rotation, a pin secured in said shaft and projecting laterally therefrom, a ratchet bushing on said shaft having external teeth and a plurality of internal notches of different depth for selectively engaging said pin, a ratchet pawl engaging said teeth, a nut on the end of the shaft for holding the spool in abutment with said bushing and said pin engaged in a selected notch, and yielding means between the nut and spool to apply a drag on the spool.

7. In a spinning reel for fishing having a spool shaft, a pick-up arm carrier and spool mounted on the shaft for relative rotation, and means for causing relative reciprocation of said carrier and spool during said relative rotation, a pin secured in said shaft and projecting laterally therefrom, a ratchet bushing on said shaft having external teeth and a plurality of pairs of diametrically opposite internal notches of different depths for selectively engaging the ends of said pin, a ratchet pawl engaging said teeth, and a nut on the end of the shaft for holding the spool in abutment with said bushing and said pin engaged in a selected pair of notches.

8. In a spinning reel for fishing having a spool shaft, a pick-up arm carrier and spool mounted on the shaft for relative rotation, and means for causing relative reciprocation of said carrier and spool during said relative rotation, a pin secured in said shaft and projecting laterally therefrom, a ratchet bushing on said shaft having external teeth and a plurality of pairs of diametrically opposite internal notches of different depths for selectively engaging the ends of said pin, a ratchet pawl engaging said teeth, a nut on the end of the shaft for holding the spool in abutment with said bushing and said pin engaged in a selected pair of notches, and yielding means between the nut and spool to apply a drag on the spool.

References Cited in the file of this patent

UNITED STATES PATENTS

| 2,495,621 | Young et al. | Jan. 24, 1950 |
| 2,550,271 | Kagel | Apr. 24, 1951 |
| 2,558,896 | Young et al. | July 3, 1951 |

FOREIGN PATENTS

| 877,510 | Germany | Mar. 26, 1953 |